Jan. 1, 1952  D. SHERMAN  2,580,854
FERTILIZER AGITATOR AND AERATOR
Filed Sept. 16, 1950
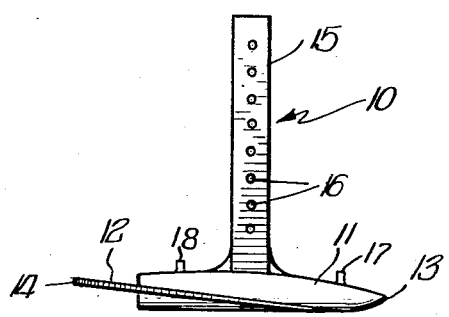
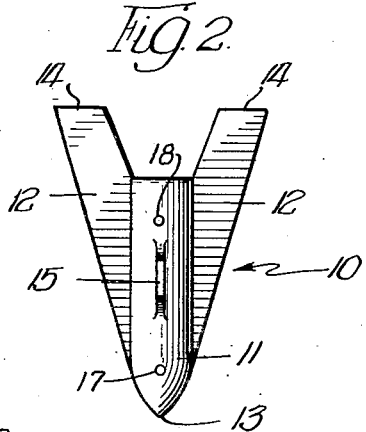
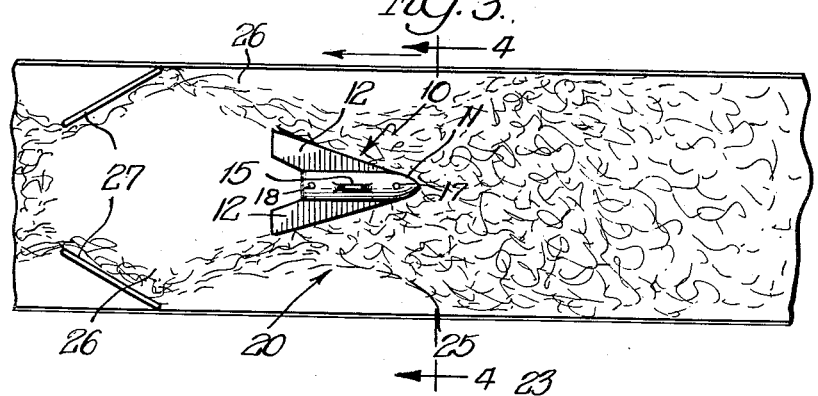
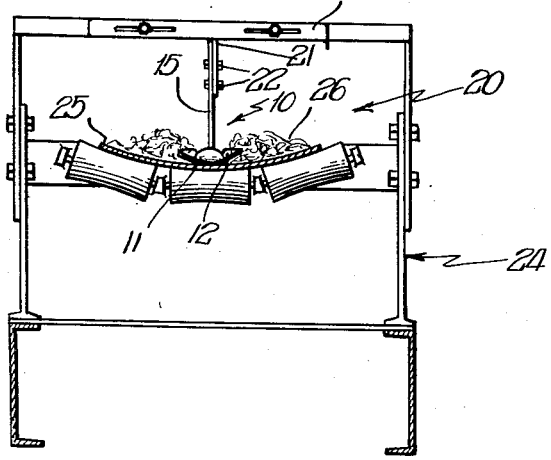
INVENTOR.
David Sherman, Patented Jan. 1, 1952

2,580,854

UNITED STATES PATENT OFFICE 2,580,854

FERTILIZER AGITATOR AND AERATOR

David Sherman, Prairie du Chien, Wis.

Application September 16, 1950, Serial No. 185,287

4 Claims. (Cl. 259—2)

My invention concerns a new and improved device for accelerating the cooling of raw commercial fertilizer as it passes from the mixing stage to the storage bins. Specifically, my invention lies in a novel aerator attachment for use in conjunction with a conventional belt conveyor or the like whereby fertilizer passing along such a conveyor conveniently may be separated, agitated and cooled prior to its discharge into a conventional storage bin.

In the manufacture of commercial fertilizer it is generally the practice to make a chemical mixture of three main constituents namely, nitrogen, phosphate and potash, which may occur in a variety of chemical forms. In general the nitrogen is obtained from nitrate salts, ammonia salts or ammonia solutions, the latter which may or may not contain dissolved nitrates. The phosphate is usually in the form of either superphosphate, triple phosphate or meta phosphate while the potash may occur as potassium oxide or potassium chloride (muriate of potash). The admixture of these constituents in accordance with a given fertilizer formula results in the generation of a great amount of heat. When the temperature of the fertilizer mixture reaches 140° F. normally a reconversion of the constituents takes place, that is, some of the available phosphates become calcium phosphate which is not readily soluble in water. This chemical phenomena, of course, is undesirable since a fertilizer should be as soluble as possible so that it readily may be absorbed by the soil. In order to maintain the utmost solubility, the fertilizer preferably should be maintained at temperatures below 140° F. at all times to circumvent the formation of the insoluble calcium phosphates. Since it is the general practice of the fertilizer manufacturers to store the raw fertilizer in large bins or piles where there is little ventilation or opportunity to cool the fertilizer, especially as to the fertilizer lying near the center of the bins or piles; it is best to cool the fertilizer mixture as much as possible before it is committed to the storage bins. Normally the fertilizer is conveyed from the mixing machinery to the storage bins by large continuous conveyor belts or chutes. Its time of travel on such conveyors affords the most convenient opportunity for cooling and it is immediately obvious that any increase in the cooling time over that afforded by the normal passage of the fertilizer along the conveyor is desirable.

To that end my present invention is directed. Briefly I propose to disclose a simple aerating device which may be suspended over the fertilizer conveyor belt or the like in such a manner that the fertilizer is scooped up from the underpassing belt, agitated and dumped back onto the belt, thus aerating and cooling the fertilizer mixture.

One of the main objects of this invention is to provide an aerating device which is adapted to agitate and cool the fertilizer as it passes from the mixing machinery to the storage bins on a conventional belt conveyor.

Another object of my invention is to demonstrate an aerating device useful in conjunction with a belt conveyor for increasing the available time for cooling fertilizer or like granular material being conveyed for a given length of belt traveling at a given speed.

Still another important object of my invention is to disclose a new and useful aerating device for use with a moving conveyor belt carrying fertilizer by virtue of which the fertilizer may be constantly agitated, cooled and prevented from forming into hard and undesirable lumps.

These and further objects and features of my invention will be recognized by those familiar with this art from the following description and in conjunction with the accompanying drawings.

In the drawings:

Figure 1 is a side elevational view of my aerating device;

Figure 2 is a top plan view of the device shown in Figure 1;

Figure 3 is a top plan view showing my aerator in use with a typical belt conveyor for carrying fertilizer; and Figure 4 is a front elevational view in cross section of the conveyor illustrated in Figure 3 taken substantially along line 4—4 of Figure 3.

From Figures 1 and 2 it will be recognized that my aerating attachment or device 10 therein illustrated, comprises a bullet shaped body portion 11 having a pair of distribution wings 12, 12 fixedly mounted along either side thereof. As seen in these two figures the wings are disposed in an upward angularly inclined disposition or relation, inclining from the bullet shaped nose 13 of the body member 11 rearwardly upward so that their trailing edges 14 extend beyond the rear limits of the body member for purposes which will appear presently.

A suspension arm or bracket 15 projects vertically from near the upper central portion of the body 11 and is fitted with a plurality of holes 16 for adjusting the hanging position of the aerator 10 over a conveyor indicated generally at 20 in Figures 3 and 4.

For an aerator of the type shown I prefer that all parts be made of non-corrosive substance or materials, such as stainless steel to resist the corrosive effects of the fertilizer, and that in use with a conveyor belt approximately eighteen inches in width, the body member 11 should be in the neighborhood of ten inches long with the wings 12 of commensurate size and overhanging the body portion at its rearward end by approximately three inches. I also contemplate that the body member 11 may be solid or hollow. If hollow it is my intention that it be fitted with suitable inlet and outlet pipe connections 17 and 18 respectively, adapted to connect with flexible hose line or the like (not shown) to provide for the circulation therein of a suitable cooling medium such as a refrigerating gas or a fluid such as water so that when the fertilizer contacts the head and wings it will be cooled at a more rapid rate.

From Figures 3 and 4 it will be seen that the suspension arm 15 is adapted to be mounted in a depending position from a leg member 21; being fitted thereto by means of two pins 22, 22 which are received in the adjusting holes 16 thereof. Leg 21 is carried by cross bar 23 mounted transversely of the conveyor 20 and supported on the upright framing 24 thereof. Preferably the aerator 10 should rest approximately one-half inch above and mid-way of the width of the conveyor belt 25 to give most efficient results so that the bullet nose 13 of the body member 11 is directed into the center of the oncoming fertilizer material piled on the conveyor belt 25. With such a set-up the bullet shaped body serves to deflect the fertilizer to the right and left over wings 12; the fertilizer being pushed along the upper faces of the wings by the oncoming fertilizer carried by the belt and falling back onto the belt over the trailing edges 14 to form two separated piles or furrows indicated at 26 in Figures 3 and 4. In this connection it is worthy to note that due to the elevational angular disposition of the wing members 12, fertilizer is raised slightly above the level of the belt to fall downwardly as it passes over the trailing edges 14; this feature leading to an increase in the amount of cooling air which contacts the fertilizer and by virtue of this suspension of the fertilizer over the moving belt as it is carried by the wing members 12, the cooling time available for a given belt run and speed is increased. Additionally the body member and wings serve to separate and agitate the fertilizer thus preventing lump formation and constantly bringing the fertilizer which lies adjacent the conveyor belt to the top of the furrows 26. Of course, it will be recognized that one such aerator would be of only slight effect and to this end I therefore propose that several aerators be placed along the belt run at desired intervals, each acting as described above. In order that the fertilizer may be thrown back to a single pile from the separated furrows 26 so that the fertilizer lies in the center of the belt 25 when approaching each successive aerator, I have provided a pair of gates or guide chutes 27 one adjacent each side of the conveyor and reaching over the belt 25, as shown in Figure 3, such being in converging angular relation to interfere with the furrows 26. By such a means the two separated furrows are guided back into a single ribbon or pile located in the center or low point of the belt. Thus each succeeding aerator serves to separate, agitate and cool the fertilizer in a like manner as it is conveyed toward the storage bins.

While I have herein shown and described one form in which the features and teachings of my invention may appear, it readily will be understood that numerous changes, modifications and substitutions of equivalents may be entered into without departing from its spirit and scope. Therefore, I do not wish to be limited to the specific embodiment herein illustrated other than may appear in the following appended claims.

I claim:

1. A device for agitating and aerating hot granular mixtures as they are carried by a continuous conveyor or the like, comprising in combination a bullet shaped body member, elevating wings mounted longitudinally to said body for lifting said granular material away from said conveyor, and an adjustable suspension bracket for maintaining said body and attached wings in an interfering position with the path of travel of said material along said conveyor.

2. In an agitating and aerating device for aiding in the cooling of commercial fertilizer as it is conveyed toward storage bins on a belt conveyor or the like, a hollow bullet shaped body member adapted to receive a circulating cooling medium within its interior, a pair of angularly positioned planar wing members fastened to said body, one along each side thereof, and an adjustable bracket means for suspending said body and attached wings above said conveyor whereby said fertilizer may meet the nose of said body, be pushed upwardly along the upper surfaces of said wings and fall back onto said conveyor in two separated furrows.

3. In a combined agitating and aerating device for cooling freshly mixed commercial fertilizer as it is being conveyed by a belt conveyor or the like, a vertical bracket member dependingly suspended above said conveyor, a bullet shaped body member mounted at the lower end of said bracket in an interfering position with the path of travel of said fertilizer on said conveyor, and a pair of elevating planar wing members divergingly mounted, one on either side of said body member whereby when said moving fertilizer on said conveyor contacts said body it will be pushed upwardly along said wings, elevated above said conveyor and dropped over the trailing edges of said wings to be aerated and turned over, said wings causing said fertilizer to be deposited in two separated furrows on said conveyor after it has passed beyond said device.

4. Apparatus for cooling freshly mixed commercial fertilizer as it is carried by a continuous conveyor, comprising, a plurality of agitating and aerating devices mounted centrally over said conveyor at designated intervals, each of said devices comprising a bullet shaped body member having a rounded frontal nose portion, adapted to interfere with and separate said moving fertilizer, and a pair of elevating angularly disposed wing members, one mounted along either side of said body member adapted to receive said fertilizer along the upper surface thereof as it leaves said body nose portion, elevate the same away from said moving conveyor and permit it to drop back onto said conveyor over the elevated rearward trailing edges thereof to form a pair of separated furrows of fertilizer on said conveyor whereby said elevation and disturbance of said fertilizer effects an efficient cooling, agitation and aeration of the same; and a pair of gate members convergingly positioned over said conveyor between successive aerating devices for converging said separated furrows of fertilizer back into a single furrow whereby the next succeeding aerating device may repeat said agitation and aeration thereof.

DAVID SHERMAN.

REFERENCES CITED

The following references are of record in the file of this patent:

UNITED STATES PATENTS

| Number | Name | Date |
| --- | --- | --- |
| 2,360,100 | Bowen | Oct. 10, 1944 |

FOREIGN PATENTS

| Number | Country | Date |
| --- | --- | --- |
| 41,297 | Denmark | Oct. 26, 1928 |